(12) United States Patent
Laufer et al.

(10) Patent No.: US 9,509,809 B2
(45) Date of Patent: Nov. 29, 2016

(54) PACKET CLASSIFICATION USING MULTIPLE PROCESSING UNITS

(71) Applicant: Alcatel-Lucent USA Inc., Murray Hill, NJ (US)

(72) Inventors: Rafael P. Laufer, Jersey City, NJ (US); Matteo Varvello, Middletown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 120 days.

(21) Appl. No.: 14/189,264

(22) Filed: Feb. 25, 2014

(65) Prior Publication Data

US 2015/0244842 A1    Aug. 27, 2015

(51) Int. Cl.
*H04L 12/28* (2006.01)
*H04L 29/06* (2006.01)
*H04L 12/741* (2013.01)

(52) U.S. Cl.
CPC ............ *H04L 69/22* (2013.01); *H04L 45/745* (2013.01)

(58) Field of Classification Search
CPC combination set(s) only.
See application file for complete search history.

(56) References Cited

U.S. PATENT DOCUMENTS

| | | | |
|---|---|---|---|
| 7,782,859 B2 * | 8/2010 | Zhang et al. | 370/392 |
| 7,934,255 B1 * | 4/2011 | Gyugyi | 726/22 |
| 2014/0029617 A1 * | 1/2014 | Wang et al. | 370/392 |

OTHER PUBLICATIONS

Nottingham et al, GPU Packet Classification using OpenCL: A Consideration of Viable Classification Methods, SAICSIT, 10 pages, 2009.*
Nottingham et al, Parallel packet classification using GPU co-processors, SAICSIT, 11 pages, 1999.*
Zhou et al, Scalable, High Performance Ethernet Forwarding with CUCKOOSWITCH, ACM, 12 pages, 2013.*
Han et al, PacketShader: A GPU-Accelerated Software Router, SIGCOMM'10, 12 pages, 2010.*
Varvello, Matteo , "Multi-Layer Packet Classification with Graphics Processing Units" http://conferences2.sigcomm.org/co-next/2014/CoNextpapers/p109.pdf, Dec. 2014.

* cited by examiner

*Primary Examiner* — Frank Duong
(74) *Attorney, Agent, or Firm* — Tong, Rea, Bentley & Kim, LLC

(57) ABSTRACT

A packet classification capability is presented herein. The packet classification capability enables improvements in packet classification via use of a combination of a primary processing unit and a secondary processing unit where the secondary processing unit is configured to perform packet classification functions in parallel based on distribution of packet classification information across processing blocks of the secondary processing unit. The processing blocks of the secondary processing unit may be supported using a set of processing elements, where each of the processing elements may include a shared memory, respectively. The secondary processing unit may be configured to use a linear search process, a tuple search process, a Bloom search process, or the like. The primary processing unit may be a Central Processing Unit (CPU) and the secondary processing unit may be a Graphics Processing Unit (GPU).

23 Claims, 7 Drawing Sheets

400

BLOOM SEARCH PROCESS

Input: Bloom filters $B$, tables $H$, masks $M$, tuples $T$
Output: rule indexes $I$ for each tuple $t \in T$
Data: Bloom filter $B'$ in shared memory
       cuckoo hash table $H'[s,d]$ in shared memory
       class mask $M'$ in shared memory 1   $B' \leftarrow$ READAOS ($B$, blockIdx, 1)
2   $H' \leftarrow$ READAOS ($H$, blockIdx, 1)
3   $M' \leftarrow$ READAOS ($M$, blockIdx, 1)
4   SYNCTHREADS()
5   $tid \leftarrow$ threadIdx
6   while $tid < |T|$ do
7       $t \leftarrow$ READSOA($T$, $tid$)     // Get a tuple
8       $u \leftarrow t$ & $M'$     // Get masked tuple
9       $x \leftarrow$ TUPLEHASH ($u$)     // Compute tuple hash
10     $match \leftarrow$ TRUE
11     for $i \leftarrow 0$ to $k - 1$ do     // Check BF bits
12         $j \leftarrow g_i(x)$
13         if $B'[j]$ = FALSE then
14            $match \leftarrow$ FALSE
15            break
16     if $match$ = TRUE then     // Find matching rule
17         $rIdx \leftarrow$ NIL
18         $rPri \leftarrow$ NIL
19         for subtable $i \leftarrow 0$ to $s - 1$ do
20            $j \leftarrow h_i(x)$     // Get subtable slot
21            if $u = H'[i,j]$ then
22                $rPri \leftarrow$ GETPRIORITY ($H'[i,j]$)
23                $rIdx \leftarrow$ blockIdx($s$×$d$)+($i$×$d$)+$j$
24                break
25     if $rIdx \neq$ NIL then     // Write to memory
26         ATOMICMAX($I[tid]$, ($rPri$ << 24) | $rIdx$)
27     $tid \leftarrow tid$+threads

PROCESS TO READ FROM AN ARRAY OF STRUCTS (READAOS)

Input: array $A$, offset $o$, entries $n$
Output: array $A'$ containing entries $A[o,...,o+n-1]$
Data: pointer $B$ to access $A$ as an array of 32-bit words
　　　pointer $B'$ to access $A'$ as an array of 32-bit words 1　$size \leftarrow$ WORDSPERENTRY()
2　$tid \leftarrow$ threadIdx
3　while $tid < n \times size$ do
4　　$B'[tid] \leftarrow B[o \times size + tid]$
5　　$tid \leftarrow tid + $ threads

PROCESS TO READ FROM A STRUCT OF ARRAYS (READSOA)

Input: array $A$, entry index $eIdx$
Output: entry $e$ containing entry $A[eIdx]$
Data: pointer $B$ to access $A$ as an array of 32-bit words
　　　pointer $B'$ to access $e$ as an array of 32-bit words 1　$size \leftarrow$ WORDSPERENTRY()
2　for $i = 0$ to $size - 1$ do
3　　$B'[i] \leftarrow B[eIdx+i \times |A|]$

FIG. 6

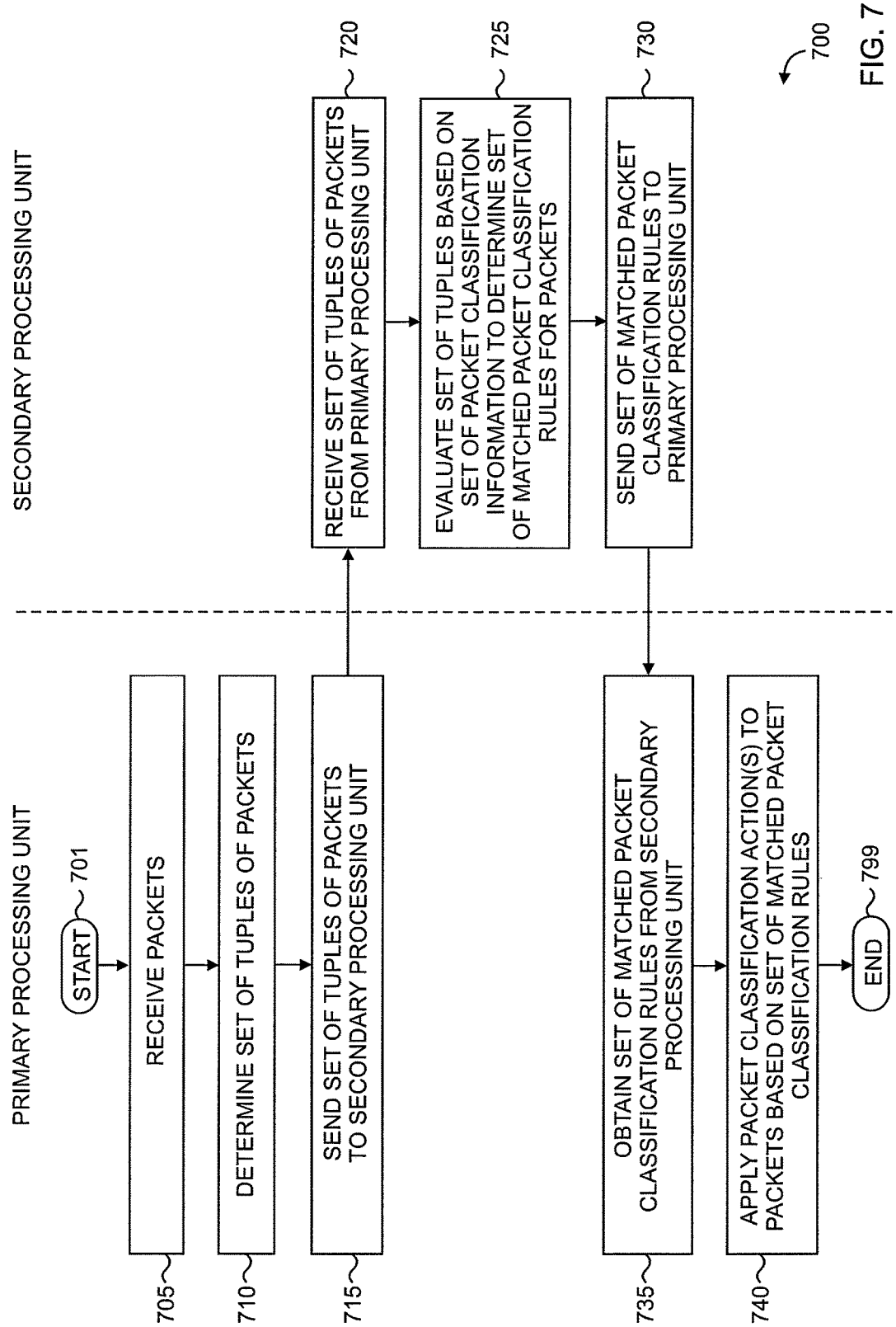

PACKET CLASSIFICATION USING MULTIPLE PROCESSING UNITS

TECHNICAL FIELD

The disclosure relates generally to communication networks and, more specifically but not exclusively, to classification of packets in communication networks.

BACKGROUND

Packet classification is used in a wide variety of contexts and for a wide variety of purposes. In general, packet classification is typically performed by matching header fields of incoming packets against a set of candidate packet classification rules in order to determine proper handling of each packet (e.g., performing a particular type of processing on the packet, forwarding the packet to a given next hop, dropping the packet, or the like). In many cases, packet classification needs to be performed across multiple network protocol layers (e.g., layers (Ls) of the Transmission Control Protocol (TCP)/Internet Protocol (IP) model) based on information from multiple network protocol layers. This is often referred to as multi-layer packet classification. For example, several types of network equipment implement multi-layer packet classification which may operate on fields from the data link, network, and transport layers, such as firewalls (e.g., operating on L2-L4 of the TCP/IP model), network address translators (e.g., operating on L3-L4 of the TCP/IP model), virtual switches in software defined networks (e.g., operating on L2-L4 of the TCP/IP), and so forth.

Many packet classification schemes are currently implemented via specialized hardware, such as ternary content-addressable memory (TCAM), in order to satisfy strict speed requirements. However, the availability of powerful commodity hardware, coupled with the high cost, limited storage, and high power consumption of TCAM, have sparked new interest in fast software-based packet classification. Additionally, recent developments in virtualized environments (e.g., multi-tenant networks, network function virtualization, and the like) have resulted in widespread adoption of virtual switches, which typically include software programs that classify packets. Many virtualized environments are operating at speeds that require throughputs of 10 Gbps or greater in order to avoid bottlenecks and delays, such that software-based packet classification speeds need to be improved in order to support such throughput requirements. Additionally, the recent emergence of software defined networking (SDN), which has a strong emphasis on rule-based flow classification and packet processing, also is driving a need for faster software-based packet classification. For example, in SDN based on OpenFlow, the relatively large rule tables and the relatively long multi-dimensional OpenFlow tuples may impose unforeseen challenges for current software-based packet classifiers that cannot be easily addressed by hardware-based packet classification schemes.

Accordingly, in view of these and various other developments related to use of software-based packet classification schemes and packet classification schemes in general, there is a renewed interest in and need for improved packet classification schemes.

SUMMARY OF EMBODIMENTS

Various deficiencies in the prior art are addressed by embodiments for improved packet classification.

In at least some embodiments, an apparatus includes a processing unit configured to receive a set of tuples of a set of packets to be classified and determine a set of matched packet classification rules matching the set of tuples of the packets to be classified. The processing unit includes a device memory and a set of processing elements. The device memory is configured to store a set of packet classification information for a set of packet classification rules configured for use in classifying packets. The set of processing elements is configured to support a set of processing blocks having respective portions of the set of packet classification information assigned thereto. The processing unit is configured to receive a set of tuples of a set of packets to be classified, and determine, based on evaluation of the set of tuples by each of the processing blocks using the respective portions of the packet classification information assigned to the processing blocks, a set of matched packet classification rules matching the set of tuples of the packets to be classified.

In at least some embodiments, a method includes receiving a set of tuples of a set of packets to be classified and determining a set of matched packet classification rules matching the set of tuples of the packets to be classified. The method includes receiving, at a processing unit, a set of tuples of a set of packets to be classified. The processing unit includes a device memory and a set of processing elements. The device memory is configured to store a set of packet classification information for a set of packet classification rules configured for use in classifying packets. The set of processing elements is configured to support a set of processing blocks having respective portions of the set of packet classification information assigned thereto. The method includes determining, by the processing unit based on evaluation of the set of tuples by each of the processing blocks using the respective portions of the packet classification information assigned to the processing blocks, a set of matched packet classification rules matching the set of tuples of the packets to be classified.

In at least some embodiments, a computer-readable storage medium stores instructions which, when executed by a computer, cause the computer to perform a method including receiving a set of tuples of a set of packets to be classified and determining a set of matched packet classification rules matching the set of tuples of the packets to be classified. The method includes receiving, at a processing unit, a set of tuples of a set of packets to be classified. The processing unit includes a device memory and a set of processing elements. The device memory is configured to store a set of packet classification information for a set of packet classification rules configured for use in classifying packets. The set of processing elements is configured to support a set of processing blocks having respective portions of the set of packet classification information assigned thereto. The method further includes determining, by the processing unit based on evaluation of the set of tuples by each of the processing blocks using the respective portions of the packet classification information assigned to the processing blocks, a set of matched packet classification rules matching the set of tuples of the packets to be classified.

BRIEF DESCRIPTION OF THE DRAWINGS

The teachings herein can be readily understood by considering the detailed description in conjunction with the accompanying drawings, in which:

FIG. 4 depicts an embodiment of a Bloom search process configured for use by the secondary processing unit of the packet classification element of FIG. 1;

FIG. 5 depicts an embodiment of a process for reading from an array of structures, for use by the linear search process of FIG. 2, the tuple search process of FIG. 3, or the Bloom search process of FIG. 4;

FIG. 6 depicts an embodiment of a process for reading from a structure of arrays, for use by the linear search process of FIG. 2, the tuple search process of FIG. 3, or the Bloom search process of FIG. 4;

FIG. 7 depicts an embodiment of a method for classifying packets at a packet classification element;

To facilitate understanding, identical reference numerals have been used, where possible, to designate identical elements common to the figures.

DETAILED DESCRIPTION OF EMBODIMENTS

A packet classification capability is presented herein. In at least some embodiments, a packet classification element is configured to perform packet classification using a primary processing unit and a secondary processing unit. In at least some embodiments, the primary processing unit and the secondary processing unit cooperate to provide an accelerated processing unit (APU). In at least some embodiments, the primary processing unit is a Central Processing Unit (CPU) and the secondary processing unit is a Graphics Processing Unit (GPU). The packet classification capability may be adapted for use with any suitable type of packet classification process (e.g., linear search, tuple search, Bloom search, or the like). It will be appreciated that embodiments of the packet classification capability may be implemented within various types of packet classification elements or various types of packet classification environments.

Figure 1:
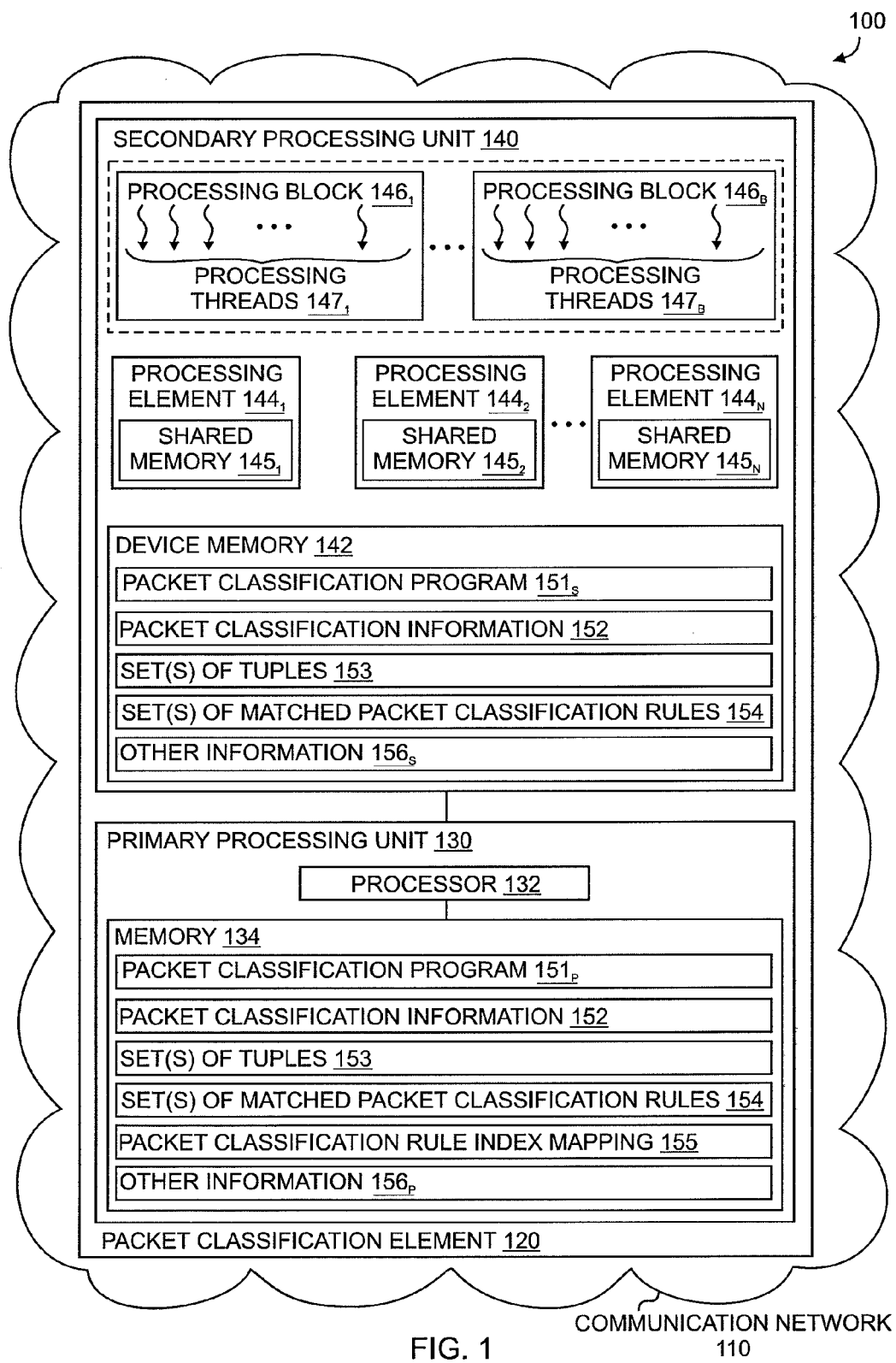
FIG. 1 depicts an exemplary communication system including a packet classification element configured to perform packet classification using a primary processing unit and a secondary processing unit.

FIG. 1 depicts an exemplary communication system including a packet classification element configured to perform packet classification using a primary processing unit and a secondary processing unit. The exemplary communication system 100 includes a communication network 110 and a packet classification element 120 communicatively connected to the communication network 110.

The communication network 110 may include any suitable type of communication network configured to support transport of packets. The communication network 110 may include any suitable type of communication network in which classification of packets is necessary or desirable. For example, communication network 110 may be a wireless access network, a wireless core network, a wireline access network, a wireline core network, an Enterprise network, a datacenter network, or the like, as well as various combinations thereof.

The packet classification element 120 is configured to receive packets and classify the packets based on a set of packet classification rules. In general, each packet typically is composed of (1) a header, which includes control information (e.g., a source IP address, a destination IP address used to route the packet, or the like) and (2) a payload, which includes the data intended for the end receiver. In general, a tuple may be defined as the set of header fields used for packet classification. In general, a packet classification rule may include a value, a mask, an action, and, optionally, a priority. The value of the packet classification rule specifies the header fields required in a tuple of a packet for which a match is required, with wildcards allowed. The mask of the packet classification rule specifies the position of the wildcarded fields within the value of the packet classification rule. The action of the packet classification rule specifies the operation or operations to be performed on a packet that includes a tuple matching the packet classification rule. The priority of the packet classification rule specifies the importance of the packet classification rule relative to other packet classification rules, and may be used to prioritize packet classification rules in cases in which multiple packet classification rules match the same tuple of a packet being classified. In general, classification of a packet based on a set of packet classification rules includes identifying one or more packet classification rules matching the tuple of the packet (or the highest priority packet classification rule matching the tuple of the packet where rule priorities are used to prioritize amongst the packet classification rules in the set of packet classification rules). The packet classification element 120 may also be configured to apply packet classification rules to packets classified based on the set of packet classification rules (e.g., applying the action(s) of the packet classification rule(s) identified as matching the tuple of the packet during classification of the packet). For example, packet classification element 120 may be implemented as a standalone network element, as part of a router, as part of a physical switch, as part of a virtual switch (e.g., for classifying packets at a hypervisor to facilitate communication among virtual machines), or the like.

The packet classification element 120 includes a primary processing unit 130 and a secondary processing unit 140 that is communicatively connected to the primary processing unit 130. In at least some embodiments, the primary processing unit 130 is a Central Processing Unit (CPU) and the secondary processing unit 140 is a Graphics Processing Unit (GPU).

The primary processing unit 130 is configured to control classification of packets received at the packet classification element 120. The primary processing unit 130 is configured to perform various functions for classifying packets based on the set of packet classification rules supported by the packet classification element 120.

The primary processing unit 130 is configured to receive a set of packets for classification, determine the corresponding set of tuples of the packets (e.g., the tuple of a given packet is a set of header fields of the given packet), and provide the set of tuples of the packets to the secondary processing unit 140 for processing by secondary processing unit 140 based on the set of packet processing rules. The primary processing unit 130 may provide the set of tuples of the packets to the secondary processing unit 140 on a per-packet basis, may provide multiple sets of tuples for multiple packets to be classified to the secondary processing unit 140 as a batch group, or the like, as well as various combinations thereof.

The secondary processing unit 140 is configured to process the set of tuples of the packets for determining a set of rule identifiers of matched packet classification rules identified as matching the set of tuples of the packets. In general, a packet classification rule is identified as matching a tuple of a packet and, thus, the packet itself, if the packet classification rule matches the set of non-wildcarded fields of the tuple of the packet. The set of matched packet classification rules for a packet may include one or more packet classification rules from the set of packet classification rules. The secondary processing unit 140 is configured to process the set of tuples of the packets for determining a set of rule identifiers of matched packet classification rules for the packets based on distribution of respective portions of the set of packet classification rules across a set of processing elements or processing blocks in a manner for supporting evaluation of the set of tuples of the packet with respect to different portions of the set of packet classification rules in parallel. The operation of the secondary processing unit 140 in processing the set of tuples of the packets for determining a set of matched packet classification rules identified as matching the packets is described in additional detail below. It will be appreciated that determining a set of rule identifiers of matched packet classification rules identified as matching the set of tuples of the packets also may be considered to be determining the matched packet classification rules identified as matching the set of tuples of the packets (as the determined rule identifiers are indicative of, and may be used to retrieve, the corresponding packet classification rules).

The primary processing unit 130 is configured to receive, from the secondary processing unit 140 for a set of packets provided to the secondary processing unit 140, a set of rule identifiers of matched packet classification rules identified by the secondary processing unit 140 as matching the packets. The primary processing unit 130 may receive the set of rule identifiers of the matched packet classification rules of the packets on a per-packet basis, may receive multiple sets of rule identifiers of matched packet classification rules for multiple packets to be classified as a batch group, or the like, as well as various combinations thereof.

The primary processing unit 130 is configured to apply the set of matched packet classification rules to the packets in the set of packet for which the set of matched packet classification rules was determined by secondary processing unit 140. Here, for purposes of clarity, it is assumed that, for each packet in the set of packets, secondary processing unit 140 determines and returns a single rule identifier of a highest-priority packet classification rule matching the tuple of the packet. However, it will be appreciated that other arrangements are possible. For example, secondary processing unit 140 may determine and return rule identifiers of multiple packet classification rules (e.g., where multiple packet classification rules at the same, highest-priority level match the tuple of the packet), and the primary processing unit 130 may apply each of the matching packet classification rules. For example, secondary processing unit 140 may determine and return rule identifiers of multiple packet classification rules (e.g., where multiple packet classification rules at the same, highest-priority level match the tuple of the packet), and the primary processing unit 130 may select a subset of the matching packet classification rules and apply the selected subset of the matching packet classification rules. In general, however, for a given packet, the primary processing unit 130 is configured to apply a matching packet classification rule to the given packet, which may include execution of an action specified by the packet classification rule. It will be appreciated that the primary processing unit 130 may apply any suitable actions which may be specified for packet classification rules (e.g., performing particular processing on the packet, forwarding the packet, dropping the packet, or the like, as well as various combinations thereof).

The primary processing unit 130 and the secondary processing unit 140 may use a set of packet classification rule identifiers (or indexes) to represent the set of packet classification rules supported by packet classification element 120. In this case, for a given packet, the set of matched packet classification rules determined by the secondary processing unit 140 and provided from the secondary processing unit 140 to the primary processing unit 130 may include the rule identifier(s) for the matched packet classification rule(s) identified as matching the tuple(s) of the packet(s). The primary processing unit 130 maintains a mapping of packet classification rule identifiers to packet classification rules for use in determining the set of matched packet classification rules indicated by the secondary processing unit 140.

The primary processing unit 130 may be implemented in any suitable manner. In at least some embodiments, as depicted in FIG. 1, primary processing unit 130 includes a processor and a memory 134 communicatively connected to processor 132. The processor 132 may include one or more processor cores. The memory 134 stores information that is configured for use by processor 132 in controlling classification of packets received at the packet classification element 120 (e.g., programs, data, or the like, as well as various combinations thereof). In at least some embodiments, as depicted in FIG. 1, memory 134 stores a packet classification program(s) $151_P$ that is configured for use by primary processing unit 130 to control classification of packets received at packet classification element 120, a set of packet classification information 152 that is configured for use by packet classification element 120 in classifying packets received at the packet classification element 120 (which may be provided to secondary processing unit 140 for use in classifying packets received at the packet classification element 120), sets of tuples 153 of packets received at packet classification element 120 (which are provided to the secondary processing unit 140 for use by the secondary processing element 140 in determining respective sets of rule identifiers of matched packet classification rules matching the sets of tuples of the packets, respectively), sets of rule identifiers of matched packet classification rules 154 determined by secondary processing unit 140 (which are determined by the secondary processing element 140 based on the set of packet classification information and returned to the primary processing unit 130), a mapping 155 of packet classification rule identifiers to packet classification rules specified by the set of packet classification information, other information $156_P$ which may be used in classifying packets received by packet classification element 120, or the like, as well as various combinations thereof.

The secondary processing unit 140 is configured to receive a set of tuples of packets and determine a set of matching packet classification rules matching the packets. The secondary processing unit 140 is configured to evaluate each tuple in the set of tuples of the packets, based on the set of packet classification rules, to determine whether the tuple matches a packet classification rule in the set of packet classification rules. The set of packet classification rules may be represented in various forms, which may also include information in addition to the packet classification rules themselves. Accordingly, a set of information including or representing a set of packet classification rules may be referred to herein as a set of packet classification information. Thus, secondary processing unit 140 may be configured to evaluate each tuple in the set of tuples of the packets, based on a set of packet classification information, to determine whether the tuple matches a given packet classification rule in the set of packet classification rules. Here, as indicated above, the set of packet classification information may vary for different packet classification schemes implemented by the secondary processing unit 140. For example, where the secondary processing unit 140 is configured to support a linear search packet classification process, the set of packet classification information may simply include the set of packet classification rules. For example, where the secondary processing unit 140 is configured to support a tuple search packet classification process, the set of packet classification information may include a set of class tables, each including a respective subset of the packet classification rules. It will be appreciated that packet classification rules may be represented in various other ways.

The secondary processing unit 140 includes a device memory 142 and a set of processing elements $144_1$-$144_N$ (collectively, processing elements 144). The secondary processing unit 140 is configured to run a set of processing blocks $146_1$-$146_B$ (collectively, processing blocks 146) using at least a portion of the set of processing elements 144. The processing blocks $146_1$-$146_B$ are configured to run sets of processing threads $147_1$-$147_B$ (collectively, sets of processing threads 147), respectively, where each set of processing threads 147 may include one or more processing threads 147 (i.e., there may be one or more processing threads $147_i$ per processing block $146_i$, respectively). It will be appreciated that the processing threads 147 of a given processing block 146 may run in parallel.

The device memory 142 stores information that is configured for use by the secondary processing unit 140 in classifying packets received by the primary processing unit 130. In at least some embodiments, as depicted in FIG. 1, the device memory 142 stores a packet classification program $151_S$ that is configured for use by the secondary processing unit 140 to perform classification of packets received at packet classification element 120, a set of packet classification information 152 that is configured for use by the packet classification element 120 in classifying packets received at the packet classification element 120 (which may be loaded into the device memory 142 before integration of the secondary processing unit 140 with the primary processing unit 130, loaded from memory 134 of the primary processing unit 130 into the device memory 142 of the secondary processing unit 140, or the like, as well various combinations thereof), sets of tuples 153 of packets received at the packet classification element 120 (which are received from the primary processing unit 130 for use by the secondary processing element 140 in determining respective sets of rule identifiers of matched packet classification rules matching the sets of tuples 153 of the packets, respectively), sets of rule identifiers of matched packet classification rules 154 determined by the secondary processing unit 140 which are determined by the secondary processing element 140 based on the set of packet classification information 152 and returned to the primary processing unit 130 for use by the primary processing unit 130 in selecting and applying packet classification actions for packets received at the packet classification element 120 (e.g., identifiers of the matching packet classification rules, rather than the packet classification rules themselves, which may be used by the primary processing unit 130 to identify the matching packet classification rules), other information $156_S$ which may be used by the secondary processing unit 140 in classifying packets received by the packet classification element 120 (at least a portion of which may be the same as other information $156_P$ of memory 134 of the primary processing unit 130 and, optionally, received from the primary processing unit 130), or the like, as well as various combinations thereof.

The processing elements 144 each are configured to run one or more of the processing blocks 146. The processing elements $144_1$-$144_N$ include shared memories $145_1$-$145_N$ (collectively, shared memories 145), respectively. The processing elements $144_1$-$144_N$ are configured to load data (e.g., tuples, packet classification information, or the like) from the device memory 142 into shared memories $145_1$-$145_N$, respectively. Similarly, the processing elements $144_1$-$144_N$ are configured to load data (e.g., packet classification results, such as rule identifiers of matching packet classification rules) from shared memories $145_1$-$145_N$ to the device memory 142, respectively (e.g. for transition to the primary processing unit 130). The processing elements 144 may be any suitable type of processing elements, which may depend on the type of secondary processing unit 140 being used. For example, the processing elements 144 may be processor cores, streaming multiprocessors, or any other suitable type of processing elements, which may depend on the implementation of the secondary processing unit 140.

The processing blocks 146 are configured to perform various functions for classifying a packet. The processing blocks 146 may be run by one or more of the processing elements 144. In general, the processing blocks 146 may be implemented on the processing elements 144 in any suitable manner (e.g., all processing blocks 146 being implemented on a single processing element 144, the processing blocks 146 being evenly or unevenly distributed across a subset of the processing elements 144, the processing blocks 146 being evenly or unevenly distributed across all of the processing elements 144, or the like). The processing blocks 146 may be implemented in any suitable manner, which may depend on the type of processing elements 144 of the secondary processing element 140. The use of a set of processing elements (such as processing elements 144) to support a set of processing blocks (such as processing blocks 146) will be understood by one skilled in the art. The processing blocks 146 of a given processing element 144 are configured to access the shared memory 145 of the given processing element 144. The processing thread(s) 147 of a given processing block 146 each may be configured to perform the functions supported by the given processing block 146, such that further parallelization of packet classification functions may be realized.

The secondary processing unit 140 is configured to receive a set of tuples of a set of packets and determine a set of matching packet classification rules matching the tuples of the packets, respectively. The secondary processing unit 140 is configured to determine a set of matching packet classification rules matching the tuples of the packets based on a distribution of the set of packet classification information across the processing blocks 146. The secondary processing unit 140 is configured to operate based on assignment of respective portions of the set of packet classification information to the processing blocks 146, respectively. In general, a processing block 146 having a portion of the set of packet classification information assigned thereto is configured to evaluate each of the tuples in the set of tuples of the set of packets against the portion of the set of packet classification information assigned to that processing block 146. A processing block 146 running on a processing element 144 and having a portion of the set of packet classification information assigned thereto is configured to load its assigned portion of the set of packet classification information from the device memory 142 into the shared memory 145 of the processing element 144 on which it is running, and to evaluate each of the tuples in the set of tuples of the set of packets against the portion of the set of packet classification information in the shared memory 145 to determine whether any of the tuples of the set of tuples match any packet classification rules of the portion of the set of packet classification information in the shared memory 145. A processing block 146 running on a processing element 144 having a shared memory 145 that is not large enough to accommodate the portion of the set of packet classification information that is assigned to the processing block 146 is configured to iteratively evaluate the tuples of the set of tuples based on respective subsets of the portion of the set of packet classification information that is assigned to the processing block 146 (e.g., loading a first subset of the assigned portion of packet classification information and evaluating the set of tuples based on the first subset, loading a second subset of the assigned portion of packet classification information and evaluating the set of tuples based on the second subset, and so forth, until the processing block 146 has evaluated the set of tuples for the full portion of the set of packet classification information assigned to the processing block 146). In general, a processing block 146 is configured to evaluate the set of tuples of the set of packets based on the portion of the set of packet classification information assigned thereto by iteratively evaluating each tuple in the set of tuples to determine whether the tuple matches one of the packet classification rules represented by the portion of packet classification information assigned to the processing block 146. In at least some embodiments, a given processing thread 147 of a given processing block 146 may evaluate a tuple by loading the tuple from the device memory 142, storing the tuple in a local register(s) or shared memory 145 of the processing element 144 on which the given processing block 146 is running, and evaluating the tuple with respect to the portion of the set of packet classification information that is assigned to the given processing block 146 (e.g., which may be loaded by the given processing block 146 from the device memory 142 into the shared memory 145 of the processing element 144 on which the given processing block 146 is running). In general, a processing block 146 having multiple processing threads 147 may be configured such that the multiple processing threads 147 may evaluate, in parallel with each other, the tuples in the set of tuples against the portion of the set of packet classification information stored in the shared memory 145 of the processing element 144 on which the given block 146 is running (e.g., each processing thread 147 evaluates one tuple in the set of tuples at a time). It will be appreciated that the manner in which a tuple is evaluated to determine whether the tuple matches one of the packet classification rules represented by the portion of packet classification information assigned to a processing block 146 may depend on the type of packet classification scheme being used by the set of processing blocks 146 (e.g., a linear search packet classification process, a tuple search packet classification process, a Bloom search packet classification process, or the like), as discussed in additional detail below. It will be appreciated that, since the processing blocks 146 may be distributed across the processing elements 144 in various ways, the distribution of the set of packet classification information across the processing blocks 146 also may be considered to be a distribution of the set of packet classification information across some or all of the processing elements 144, depending on distribution of the processing blocks 146 across the processing elements 144. In this manner, the secondary processing unit 140 is configured to exploit parallelism and availability of faster on-chip memory (illustratively, shared memories 145) in order to increase the speed of packet classification at packet classification element 120.

As discussed above, the secondary processing unit 140 may be configured in a number of ways to support packet classification for a packet, which may include variations in the number of processing elements 144 used, the number of processing blocks 146 used, the assignment of processing blocks 146 to processing elements 144, the assignment of portions of packet classification information to processing blocks 146, or the like, as well as various combinations thereof. For example, where the secondary processing unit 140 includes 16 processing elements 144 and 16 processing blocks 146 are to be used by the secondary processing unit 140 for matching the set of tuples of the set of packets, the 16 processing blocks 146 may be distributed across the 16 processing elements 144 such that there is 1 processing block 146 per processing element 144, the 16 processing blocks 146 may be distributed across only 8 of the 16 processing elements 144 by assigning 2 processing blocks 146 to each of the 8 processing elements 144, or the like. For example, where 16 processing blocks 146 are used by the secondary processing unit 140 for matching the set of tuples of the set of packets and the set of packet classification information corresponds to a set of packet classification rules including 512 packet classification rules, each processing block 146 may have assigned thereto packet classification information for 32 of the 512 packet classification rules, respectively. For example, where 64 processing blocks 146 are used by secondary processing unit 140 for matching the set of tuples of a packet and the set of packet classification information corresponds to a set of packet classification rules including 1024 packet classification rules, the packet classification information for the 1024 packet classification rules may be assigned to the processing blocks sequentially (e.g., packet classification rules 0-15 are assigned to processing block 0, packet classification rules 16-31 are assigned to processing block 1, and so forth, with packet classification rules 1008-1023 being assigned to processing block 63). For example, where 32 processing blocks 146 are used by secondary processing unit 140 for matching the set of tuples of the set of packets, the set of packet classification information corresponds to a set of packet classification rules including 512 packet classification rules, and the shared memory of the processing elements 144 running the processing blocks 146 are only capable of accommodating 8 packet classification rules at a time, the packet classification information for the 512 packet classification rules may be assigned to the processing blocks based on these various constraints (e.g., packet classification rules 0-7 and 256-263 are assigned to processing block 0, packet classification rules 8-15 and 264-271 are assigned to processing block 1, and so forth, with packet classification rules 248-255 and 504-511 being assigned to processing block 31). It will be appreciated that the foregoing examples are merely a few of the many ways in which the secondary processing unit 140 may be configured to support packet classification for packets received by the primary processing unit 130.

As discussed above, the secondary processing unit 140 may be configured to utilize various types of packet classification schemes for classifying packets received at primary processing unit 130, such as linear search processes, tuple search processes, Bloom search processes, or the like. An exemplary implementation of a modified linear search process, configured for use by the secondary processing unit 140 in packet classification, is depicted and described in FIG. 2. An exemplary implementation of a modified tuple search process, for use by the secondary processing unit 140 in packet classification, is depicted and described in FIG. 3. An exemplary implementation of a Bloom search process, for use by the secondary processing unit 140 in packet classification, is depicted and described in FIG. 4. It will be appreciated that, although primarily depicted and described with respect to embodiments in which the secondary processing unit 140 is configured to implement modified versions of a linear search process, a tuple search process, or a Bloom search process, the secondary processing unit 140 also may be configured to implement any other suitable type(s) of search processes which may be used for packet classification.

Figures 2, 3:
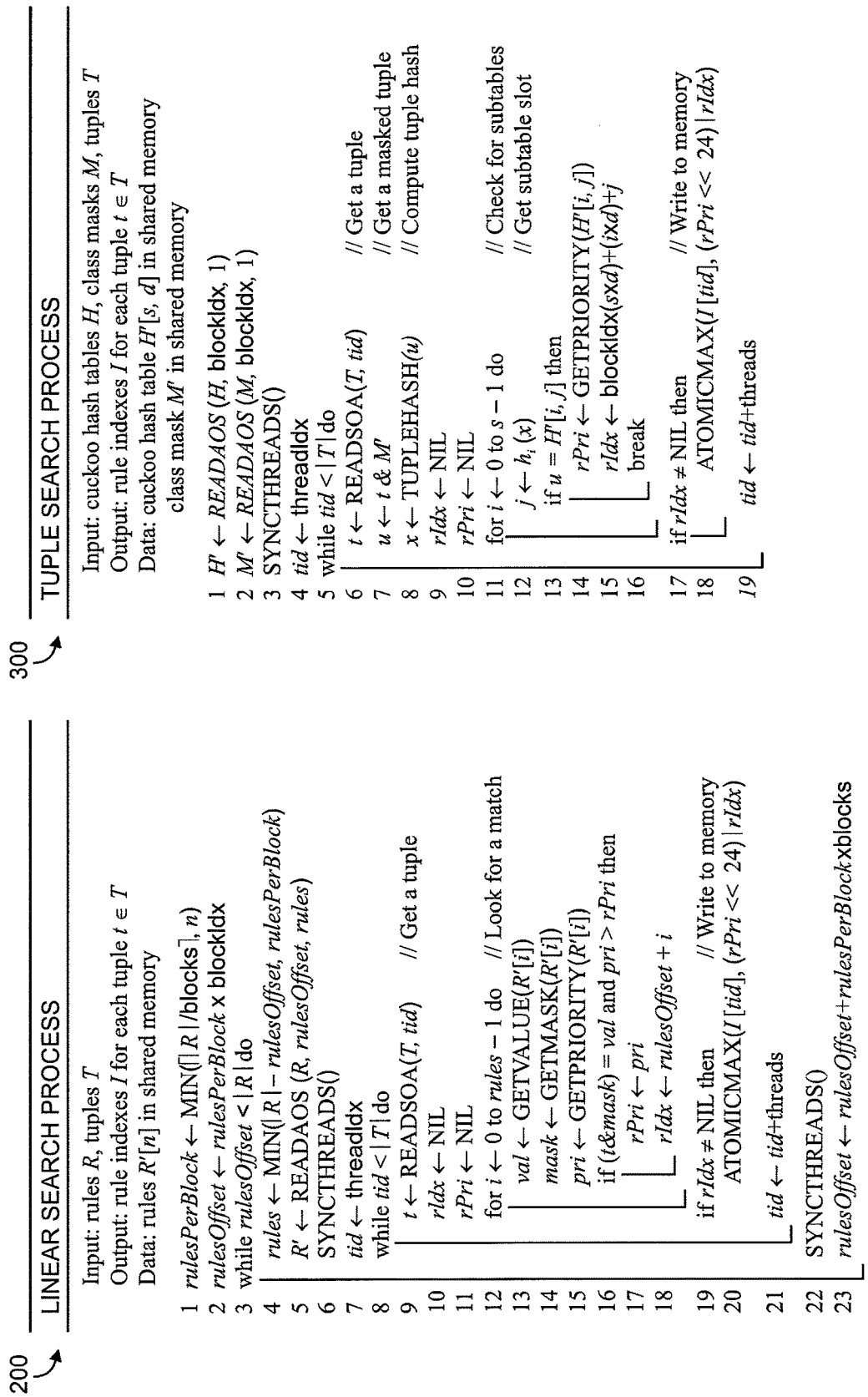
FIG. 2 depicts an embodiment of a linear search process configured for use by the secondary processing unit of the packet classification element of FIG. 1.
FIG. 3 depicts an embodiment of a tuple search process configured for use by the secondary processing unit of the packet classification element of FIG. 1.

FIG. 2 depicts an embodiment of a linear search process configured for use by the secondary processing unit 140 of the packet classification element 120 of FIG. 1. In general, linear search processes typically check a tuple of a packet against the set of packet classification rules by, for each packet classification rule in the set of packet classification rules, masking the tuple of the packet using wildcard bits from the mask of the packet classification rule and comparing the masked tuple with the value of the packet classification rule. The linear search process 200 of FIG. 2 (which also may be referred to as a linear search kernel) may be used as the packet classification program $151_S$ of secondary processing unit 140 of FIG. 1. The linear search process 200 takes as input a packet classification rule array R, including each of the packet classification rules of the set of packet classification rules, and a tuple array T, including each of the tuples of the packet for which packet classification is to be performed. The linear search process 200 produces as output an index array I including, for each tuple t in the tuple array T, an index of a highest-priority packet classification rule that matches the tuple t. The linear search process 200 computes the index of a highest-priority matching packet classification rule for each tuple t in tuple array T and stores the index in the index array I (which is stored in the device memory 142 and transferred from the secondary processing unit 140 to the primary processing unit 130 for use by the primary processing unit 130 to determine the action(s) to perform for the packet). The R, T, and I arrays are stored in the device memory 142 of the secondary processing unit 140. Additionally, each processing block 146 of the secondary processing unit 140 also maintains a copy of n packet classification rules (which may include all or a subset of the packet classification rules assigned to that processing block 146, and which may be denoted as vector R') that are loaded, at run-time, into the shared memory 145 of the processing element 144 that is hosting that processing block 146). It is noted that, in the programming of the secondary processing unit 140, a set of variables is expected to be available to each of the processing threads 147 at runtime as follows: (1) blockIdx and threadIdx, which are the block index of the processing block 146 on which the processing thread 147 is running and the thread index of the processing thread 147 of that processing block 146, respectively, and (2) blocks and threads, which are the number of processing blocks 146 to be used for packet classification and the number of processing threads 147 per processing block 146, respectively. The linear search process 200 is configured to increase, and in at least some cases maximize, parallelism by splitting the packet classification rules of the set of packet classification rules among the processing blocks 146 of the secondary processing unit 140, such that each processing block 146 of the secondary processing unit 140 is responsible for checking the tuples t in the tuple array T against only a subset of packet classification rules from the set of packet classification rules, respectively. Accordingly, line 1 of linear search process 200 computes the maximum number of packet classification rules per processing block 146 based on the shared memory limit of n rules per shared memory 145, and line 2 of linear search process 200 calculates the offset of the processing block 146 within the set of packet classification rules. In general, lines 3-23 of linear search process 200 are the core of linear search process 200. In each iteration of lines 3-23 of linear search process 200, each processing thread 147 in processing block 146 evaluates a tuple t in the tuple array T with respect to a set of at most n packet classification rules (which is expected, but not required, to include only a subset of the packet classification rules from the full set of packet classification rules used by packet classification element 120 for classifying packets). In each iteration of lines 3-23 of linear search process 200, each processing thread 147 in the processing block 146 compares a tuple t in the tuple array T with the associated subset of packet classification rules (at most n packet classification rules) that have been assigned to that processing block 146 and copied into the shared memory 145 of the processing element 144 running that processing block 146 for use by the processing block 146 in evaluating each tuple t with respect to the associated subset of packet classification rules that have been assigned to that processing block 146. The "while" loop in line 3 of linear search process 200 runs until the current offset exceeds the number of packet classification rules |R|, such that it will be appreciated that lines 3-23 of linear search process 200 may be repeated for each of two or more subsets of packet classification rules from the set of packet classification rules used by packet classification element 120 for classifying packets. Thus, it will be appreciated that lines 3-23 of linear search process 200 may be performed by each processing thread 147 of the processing block 146 one or more times for evaluating the set of tuples T based on the subset of packet classification rules assigned to the processing block 146 (e.g., lines 3-23 of linear search process 200 may be performed by a given processing thread 147 of a processing block 146 multiple times where the subset of packet classification rules assigned to the processing block 146 cannot be handled in a single execution of lines 3-23 of linear search process 200, such as where the shared memory 145 of the associated processing element 144 is not large enough to accommodate the subset of packet classification rules assigned to the processing block 146). In line 4 of linear search process 200, for a given processing block 146, the actual number of packet classification rules to copy to the shared memory 145 of the associated processing element 144 for that processing block 146 is computed. In line 5 of linear search process 200, for a given processing block 146, coalesced memory accesses are performed in order to load the subset of packet classification rules for that processing block 146 into the shared memory 145 of the processing element 144 running that processing block 146. The READAOS( ) call of line 5 of linear search process 200, which is depicted as process 500 of FIG. 5, enables each processing thread 147 of the associated processing block 146 to copy an m-bit word (in this example, a 32-bit word) at a time from an array of structures (AoS). It is noted that the processing threads 147 of the processing block 146 have consecutive threadIdx indexes and, as a result, access consecutive memory addresses, thereby guaranteeing coalesced memory accesses. The SYNCTHREADS( ) call in line 6 of linear search process 200 imposes a synchronization barrier to ensure that all processing threads 147 in the processing block 146 have finished copying after this line. In lines 8-20 of the linear search process 200, for a given processing thread 147 in a processing block 146, matching of a tuple t in the tuple array T based on the packet classification rules loaded to the shared memory 145 is performed. As indicated in line 7 of linear search process 200, each processing thread 147 of the processing block 146 initially uses its threadIdx in order to read a tuple t from the tuple array T in line 9 using the READSOA( ) call, which is depicted as process 600 of FIG. 6. In this case, the tuple array T is organized as a structure of arrays (SoA) with m-bit granularity (e.g., the first m-bit word of each tuple t is stored sequentially in the shared memory 145, then the second m-bit word of each tuple t is stored sequentially in the shared memory 145, and so forth). The SoA format allows each processing thread 147 of the processing block 146 to load a unique tuple t in line 9 while still ensuring that memory accesses are coalesced. In lines 10-11 of the linear search process 200, the variables rIdx and rPri are initialized to NIL. These temporary variables store the current index of the highest-priority packet classification rule matching the tuple t. In lines 12-18 of the linear search process 200, the tuple t is checked against all of the packet classification rules in the shared memory 145 of the processing element 144 (which, as discussed herein, may include all or a subset of the packet classification rules assigned to the processing block 146). If tuple t, after proper masking, matches a packet classification rule with higher priority than any previous packet classification rule, then the priority (line 15 of the linear search process 200) and the global index of this packet classification rule (line 18 of the linear search process 200) are saved in rIdx and rPri, respectively. In lines 19-20 of the linear search process 200, in case of a match of the tuple t to one or more of the packet classification rules in the shared memory 145, the index of the matching packet classification rule having the highest priority is written to device memory 142 of the secondary processing unit 140. In line 19 of linear search process 200, the ATOMICMAX(u,v) call stores the value of v into u only if v is higher than u. It is noted that this call is atomic to prevent potential racing conditions among the different processing blocks 146 running on different processing elements 144. The rule priority may be stored in the most significant bits in order to ensure that a higher-priority packet classification rule has precedence regardless of its index value. In line 22 of the linear search process 200, the SYNCTHREADS( ) call is called in order to ensure that all processing threads 147 of the processing block 146 have finished with the current subset of packet classification rules in the shared memory 145 before moving on to processing of the next subset of packet classification rules from the subset of packet classification rules assigned to the processing block 146. In line 23 of the linear search process 200, the rule offset is then increased for use in determining whether packet classification of the processing block 146 is complete (i.e., whether the tuples in the tuple array T assigned to processing block 146 have been processed based on the subset of packet classification rules in the set of packet classification rules assigned to processing block 146). The processing block 146 may then return to line 3 for determining whether (1) the tuples of tuple array T have not yet been evaluated with respect to the full set of packet classification rules used by processing block 146 for classifying packets (in which case processing block 146 proceeds to evaluate the tuples of the tuple array T with respect to a next subset of rules of the full set of packet classification rules used by processing block 146) or (2) the tuples of tuple array T have been evaluated with respect to the full set of packet classification rules used by processing block 146 for classifying packets (in which case processing block 146 ends the classification of the tuples in the tuple array T). The linear search process 200 ends after all processing blocks 146 are finished. It will be appreciated that linear search process 200 of FIG. 2 may be implemented in other ways.

FIG. 3 depicts an embodiment of a tuple search process configured for use by the secondary processing unit of the packet classification element of FIG. 1. In general, tuple search is more efficient than linear search for relatively large rule sets, as linear search typically takes O(RT) time and, therefore, does not scale well as the number of rules increases. It is noted that tuple search is the packet classification scheme used by Open vSwitch as well as various other types of packet classification elements. In general, tuple search uses the notion of a class of packet classification rules with the same mask (i.e., packet classification rules having wildcards for the same header bits). In tuple search, (1) packet classification rules that are members of a given class are stored in the same class table (which is typically implemented as a hash table for efficient lookup), (2) the rule value is the key being hashed and the packet classification rule, represented by the set <value, action, priority>, is stored in the class table, and (3) each class has a class mask which is the same for all packet classification rules of the class. In general, tuple search performs matching for a given tuple by searching for the tuple within each class table after proper masking. The class tables may be implemented using cuckoo hashing, as cuckoo hashing provides constant lookup time and is more efficient than regular hash tables using chaining (although it will be appreciated that the class tables may be implemented using any other suitable schemes). In a class table implemented using cuckoo hashing, the class table is composed of s equally-sized sub-tables, each including d slots. Let $R=\{r_1, r_2, \ldots, r_n\}$, with $n \leq s \times d$, be the set of packet classification rules to be inserted into the class table. To insert a packet classification rule $r_i$ into the class table, the hash values $h_1(r_i), h_2(r_i), \ldots, h_s(r_i)$ are computed and used as indexes in each of the corresponding sub-tables. If one of these slots is empty, then packet classification rule $r_i$ is stored at this position and the insertion is complete; otherwise, a sub-table q is randomly selected and a packet classification rule $r_j$, stored at slot $h_q(r_i)=h_q(r_j)$ of sub-table q, is evicted to make space for packet classification rule $r_i$. The same procedure is then repeated in order to reinsert packet classification rule $r_j$ back into the class table. If, during this procedure, a threshold number of tries is reached, then new hash functions $h_1(\bullet), h_2(\bullet), \ldots, h_s(\bullet)$ are selected and all packet classification rules are reinserted into the class table using these new hash functions. It will be appreciated, however, that such rehashes are expected to be quite rare as long as the class table is well dimensioned. In general, a lookup of a tuple t in the class table includes (1) masking tuple t with the class mask to derive the masked tuple u, and (2) checking the slots $h_1(u), h_2(u), \ldots, h_s(u)$ in each of the s sub-tables of the class table, which is expected to be done in O(s) time in the worst case. The hashing may be performed using any suitable hash functions (e.g., a universal hash function, the MurmurHash3 hash function, the SuperFastHash hash function, or the like), although it is noted that, due to their relative simplicity, universal hash functions are expected to provide the highest computation throughput. The tuple search process 300 of FIG. 3 (which also may be referred to as a tuple search kernel) may be used as the packet classification program $151_S$ of secondary processing unit 140 of FIG. 1. The tuple search process 300 uses cuckoo hashing with a universal hash function (although, as noted above, other types of class tables, with or without hashing, and other types of hash functions may be used). The tuple search process 300 uses universal hash functions defined as $h_i(x)=[(a_i x+b_i) \bmod p] \bmod d$, where p is a large prime and both $a_i$ and $b_i$ are randomly selected integers modulo p with $a_i \neq 0$ (although, again, it is noted that the hash functions may be defined in any other suitable manner). The parameters $a_i$ and $b_i$ may be loaded to device memory 142 of secondary processing unit 140 during initialization of secondary processing unit 140 and then stored in a read-only cache of secondary processing unit 140 during execution of tuple search process 300 for faster hash computation. The tuple search process 300 takes as input: a class table array H including the class tables (e.g., the cuckoo hash tables) for the classes, a class mask array M including the class masks for the classes, and a tuple array T including each of the tuples of the packet for which packet classification is to be performed. The tuple search process 300 produces as output an index array I including, for each tuple t in tuple array T, an index of the highest-priority packet classification rule matching the tuple t. The tuple search process 300 is configured such that each processing block 146 is responsible for matching the tuples of the tuple set T against only a subset of the classes, respectively (e.g., a single class per processing block 146, multiple classes per processing block 146 where the multiple classes are handled by the processing block 146 serially, or the like). Thus, it will be appreciated that lines 1-19 of tuple search process 300 may be performed by each processing block 146 one or more times for evaluating the set of tuples T based on the subset of classes and, thus, associated class tables, assigned to the processing block 146 (e.g., lines 1-19 of tuple search process 300 may be performed by a given processing block 146 multiple times, once for each class table, where multiple class tables are assigned to the processing block 146). In each iteration of lines 1-19 of tuple search process 300 by a processing block 146 for a given class table, the tuples in the tuple array T are evaluated with respect to the class table, which includes only a portion of the packet classification rules from the full set of packet classification rules used by packet classification element 120 for classifying packets. In each iteration of lines 1-19 of tuple search process 300 by a processing block 146 for a given class table, the processing block 146 maintains a copy of a class table (denoted as H') and the associated class mask (denoted as M') for the class table, which are loaded at run-time to the shared memory 145 of the processing element 144 hosting the processing block 146, for use in evaluating the tuples in the tuple set T. In each iteration of lines 1-19 of the tuple search process 300 by a processing block 146 for a given class table, the processing block 146 compares the tuples in the tuple array T with the associated subset of packet classification rules of the packet class that has been assigned to that processing block 146 and copied into the shared memory 145 of the processing element 144 running that processing block 146 for use by the processing block 146 in evaluating each of the tuples with respect to the associated subset of packet classification rules of the packet class that has been assigned to that processing block 146. The lines of the tuple search process 300 are now described in more detail for a given class assigned to a given processing block 146. In lines 1-2 of tuple search process 300, the class table and class mask are loaded to shared memory 145 of the processing element 144 hosting the processing block 146 using coalesced accesses. It is noted that, since each processing block 146 is responsible for a respective class, blockIdx may be used as the offset in both cases. In line 3 of tuple search process 300, a SyncThreads( ) call is used to ensure that the processing threads 147 in the processing block 146 have finished copying. In tuple search process 300, lines 5-16 perform the table lookup. In line 6 of tuple search process 300, each processing thread 147 of the processing block 146 loads a tuple t from the tuple array T, respectively. In line 7 of tuple search process 300, a logical AND of the tuple t loaded in line 6 and the class mask M' is performed in order to derive the masked tuple u. In line 8 of tuple search process 300, the m-bit tuple hash x is computed in order to speed up the slot computations performed in line 12 of tuple search process 300. In lines 11-18 of tuple search process 300, each sub-table of the currently selected class table is evaluated (indicated by the "for" loop of line 11), the candidate slot for u is computed based on x (line 12), the masked tuple u is compared with the rule value in the candidate slot (line 13), and, based on a determination that the masked tuple u matches the rule value in the candidate slot, then the priority and the global index of the packet classification rule are stored (lines 14-15) for later writing to device memory 142 of the secondary processing unit 140 (lines 17-18). In line 19 of tuple search process 300, the tuple offset is then increased for use in determining whether packet classification for the packet by the processing block 146 is complete. The processing block 146 may then return to line 5 for determining whether (1) all tuples of tuple array T have not yet been evaluated (in which case processing block 146 proceeds to evaluate the remaining tuples of tuple array T) or (2) all tuples of tuple array T have been evaluated (in which case processing block 146 ends for the classification of the current packet). The tuple search process 300 ends after all processing blocks 146 are finished. It will be appreciated that the tuple search process 300 of FIG. 3 may be implemented in other ways.

FIG. 4 depicts an embodiment of a Bloom search process configured for use by the secondary processing unit of the packet classification element of FIG. 1. In general, Bloom search is more efficient than tuple search for relatively large rule sets having a relatively large number of rule classes. This is at least partly due to the fact that tuple search typically requires checking of a tuple against each class table, which translates into a relatively large number of table lookups in the case of many rule classes. By contrast, Bloom search uses Bloom filters (or other suitable data structures) as compact representations of the class tables of the rule classes, thereby increasing the speed with which matching rule classes may be identified and ensuring that table lookups are only performed for rule classes associated with Bloom filter matches (e.g., a match on a Bloom filter associated with a class table is indicative that the class table is potentially storing a packet classification rule that matches the tuple being evaluated). In general, a Bloom filter is a space-efficient data structure composed of an array of m bits and k independent hash functions $g_1(\bullet), g_2(\bullet), \ldots, g_k(\bullet)$ whose outputs are uniformly distributed over the discrete range $\{0, 1, \ldots, m-1\}$. For each rule class of the set of packet classification rules, an associated Bloom filter is used to represent a set of n packet classification rules $R=\{r_1, r_2, \ldots, r_n\}$ within the rule class where (a) initially, all of the bits in the Bloom filter are set to 0 and (b) for each rule $r_i$ in the set of rules R of the rule class, the bits of bit positions $g_1(r_i), g_2(r), \ldots, g_k(r)$ are set to 1. In Bloom search, the lookup for a tuple t in a rule class C is performed by masking the tuple t with the class mask of the rule class to derive a masked tuple u, and determining whether the masked tuple u has a match in the Bloom filter of the rule class by checking whether the bits of bit positions $g_1(u)$, $g_2(u), \ldots, g_k(u)$ are set to 1. If at least one bit of the bit positions is set to zero (i.e., a match is not identified in the Bloom filter), then no packet classification rule in rule set R of rule class C applies to tuple t. If all bits of the bit positions are set to 1, there is a match on the Bloom filter and a packet classification rule applicable to tuple t is present within rule set R of rule class C with high probability (given the low probability of a false positive, which may be maintained at a relatively low level via proper selection of the m and k parameters for a given number of rules n for the rule class). In Bloom search, for each rule class having a potential match for the tuple t, the corresponding table storing the n packet classification rules for the rule class is searched to determine whether a packet classification rule matching the tuple t is present (i.e., the match in the Bloom filter for the rule class was not a false positive) or whether a packet classification rule matching the tuple t is not present (i.e., the match in the Bloom filter for the rule class was a false positive). The Bloom search process 400 is similar to the tuple search process 300 of FIG. 4 with the exception of a few differences, a discussion of which follows. First, for any rule class being evaluated by a processing element 144, the associated Bloom filter for the rule class is loaded into the shared memory 145 of the processing element 144 for use in evaluating tuples (line 1 of the Bloom search process 400) and, further, for each tuple being evaluated the bits of the Bloom filter are checked for determining whether the cuckoo hash table for the rule class potentially includes a packet classification rule matching the tuple being evaluated (lines 10-15 of the Bloom search process 500). In lines 10-15, before making a lookup in the cuckoo hash table, a lookup in the class Bloom filter is performed. From the tuple hash x, the bit index j is computed by computing $g_i(x)$ in line 12. In line 13, a check is performed to determine if bit B'[j] is 0 and, if so, the variable match is reset to indicate that tuple t is not in the cuckoo hash table. If there is a match for all bits, then the cuckoo hash lookup is performed in lines 17-24 and the memory write is performed in lines 25-26, if necessary, in a similar fashion to tuple search.

It will be appreciated that, although primarily depicted and described with respect to acceleration of the secondary processing unit for specific packet classification schemes (namely, linear search, tuple search, and Bloom search), various principles depicted and described with respect to acceleration of the secondary processing unit for these specific packet classification schemes may be applied for accelerating the secondary processing unit for various other types of packet classification schemes (e.g., packet classification schemes well-suited for processing units supporting parallelism and memory capabilities similar to those of secondary processing unit depicted and described herein).

It will be appreciated that, although primarily depicted and described with respect to acceleration of packet classification schemes for a specific type of secondary processing unit (namely, a GPU or GPU-like device), various principles depicted and described with respect to acceleration of packet classification schemes for this specific type of secondary processing unit may be applied for accelerating packet classification schemes for various other types of secondary processing units (e.g., for other types of secondary processing units, supporting suitable parallelism and memory capabilities, which may be used in conjunction with CPUs or CPU-like devices in order to accelerate packet classification schemes).

FIG. 7 depicts an embodiment of a method for classifying packets at a packet classification element. As depicted in FIG. 7, a portion of the steps of method 700 are performed by a primary processing unit of the packet classification element (e.g., the primary processing unit 130 of the packet classification element 120 of FIG. 1) and a portion of the steps of method 700 are performed by a secondary processing unit of the packet classification element (e.g., the secondary processing unit 140 of packet classification element 120 of FIG. 1). It will be appreciated that, although depicted and described as being performed serially, at least a portion of the steps of method 700 may be performed contemporaneously or in a different order than presented in FIG. 7. It will be appreciated that, although omitted for purposes of clarity, packet classification information for use in classifying packets at the packet classification element needs to be made available to the secondary processing unit (e.g., copying all of the packet classification information to the secondary processing unit as an initial step of method 700 where secondary processing unit does not currently have any packet classification information, copying updates to packet classification information to the secondary processing unit as an initial step of method 700 where the secondary processing unit already includes packet classification information, or the like). At step 701, method 700 begins. At step 705, the primary processing unit receives a set of packets, which may include one or more packets. At step 710, the primary processing unit determines the set of tuples of the packets. At step 715, the set of tuples of the packets is sent from the primary processing unit to the secondary processing unit. The set of tuples of the packets may be sent from the primary processing unit to the secondary processing unit by the primary processing unit or by the primary processing unit programming the secondary processing unit to read the set of tuples of the packets from the primary memory of the primary processing unit directly using direct memory access (DMA). At step 720, the secondary processing unit receives the set of tuples of the packets from the primary processing unit. The secondary processing unit may store the set of tuples in a device memory of the secondary processing unit. At step 725, the secondary processing unit evaluates the set of tuples based on a set of packet classification information to determine a set of rule identifiers of matched packet classification rules for the packets (i.e., rule identifiers of matched packet classification rules matching the tuples of the packets). The secondary processing unit evaluates the set of tuples based on the set of packet classification information by using a set of processing blocks 146 to evaluate the set of tuples with respect to subsets of packet classification information assigned to the processing blocks, respectively. At step 730, the set of rule identifiers of matched packet classification rules (as opposed to the rules themselves) for the packets is sent from the secondary processing unit to the primary processing unit. The set of rule identifiers of the matched packet classification rules for the packets may be sent from the secondary processing unit to the primary processing unit by the secondary processing unit or by programming the secondary processing unit to write the set of rule identifiers of the matched packet classification rules for the packets to the primary memory of the primary processing unit directly using direct memory access (DMA). At step 735, the primary processing unit obtains the set of rule identifiers of the matched packet classification rules for the packets (e.g., by receiving the set of matched packet classification rules for the packets from the secondary processing unit or by reading the set of rule identifiers of the matched packet classification rules for the packets from the memory address where the secondary processing unit wrote the set of rule identifiers of the matched packet classification rules for the packets using DMA). At step 740, the primary processing unit applies one or more packet classification actions to the packets based on the set of rule identifiers of the matched packet classification rules for the packets. For a given packet, this may include using the rule identifier of the matched packet classification rule for the packet (determined by the secondary processing unit) to retrieve the matched packet classification rule for the packet and applying the action of the matched packet classification rule to the packet. At step 799, method 700 ends.

Figure 8:
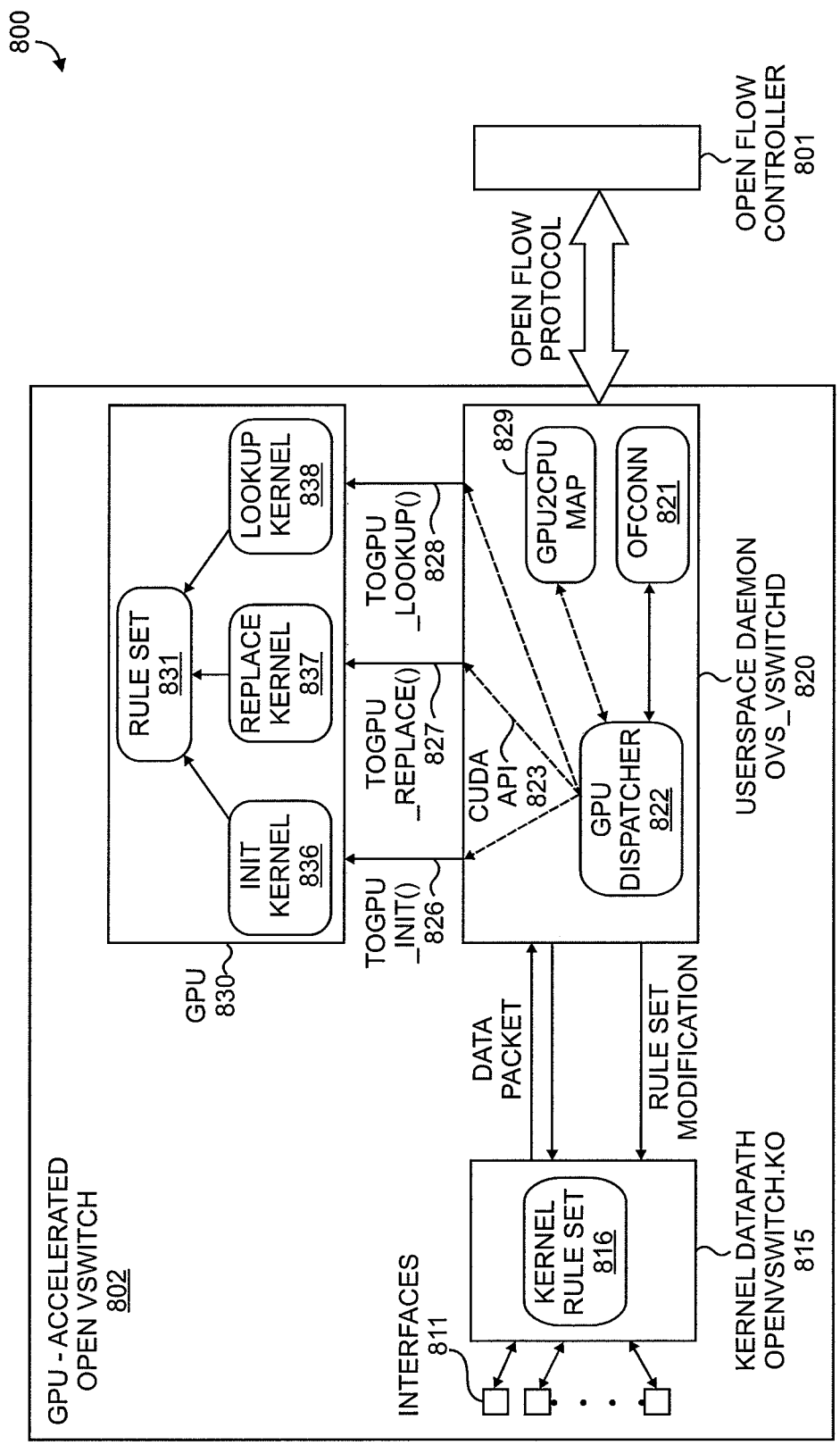
FIG. 8 depicts an exemplary embodiment of a GPU-accelerated Open vSwitch.

FIG. 8 depicts an exemplary embodiment of an OpenFlow network including a GPU-accelerated Open vSwitch and an OpenFlow controller. As per OpenFlow, Open vSwitch divides the packet classification problem into exact matching and wildcard matching, where exact matching refers to matching a tuple against packet classification rules where no wildcards are allowed, and wildcard matching refers to matching a tuple against packet classification rules where wildcards are allowed. The OpenFlow network include an OpenFlow controller 801 and a GPU-accelerated Open vSwitch 802 configured to communicate using the OpenFlow protocol. The GPU-accelerated Open vSwitch 802 includes a set of network interfaces 811, a kernel-level datapath 815 (also denoted as openvswitch.ko in FIG. 8), a userspace daemon 820 (also denoted as ovs_vswitchd in FIG. 8), and a GPU 830. The kernel-level datapath 815 implements exact matching, whereas the userspace daemon 820 implements wildcard matching. The userspace daemon 820 also implements the control and management functions of the GPU-accelerated Open vSwitch 802, e.g., an ofconn module 821 which communicates with OpenFlow controller 801 and interfaces to switch configuration utilities (e.g., ovs-ofctl, ovs-vsctl, or the like). In GPU-accelerated Open vSwitch 802, a set of packets is received via one of the network interfaces 811 and provided to the kernel-level datapath 815. The kernel-level datapath 815 determines the set of tuples of the set of packets. The kernel-level datapath 815 first attempts to match each of the tuples of the packets against a kernel rule set 816 in the kernel-level datapath 815 using exact matching. If an exact match for a given tuple of the packets is not found in the kernel rule set 816 of the kernel-level datapath 815, an upcall is launched at the userspace daemon 820 where wildcard matching is performed for the given tuples. The userspace daemon 820 uses tuple search (e.g., a version of tuple search process 300 of FIG. 3) to implement wildcard matching (e.g., the packet classification rules are partitioned across class tables based on the masks of the class tables). The userspace daemon 820 includes a GPU dispatcher 822 that is configured to delegate wildcard matching to GPU 830 using a CUDA run-time API 823. The GPU 830 includes a rule set 831 and three kernels configured to operate on rule set 831, including: an INIT kernel 836, a REPLACE kernel 837, and a LOOKUP kernel 838. The GPU dispatcher 822 is configured to manage several interfaces implemented between the userspace daemon 820 and the GPU 830: a TOGPU INIT( ) interface 826 for GPU data structures initialization using INIT kernel 836 of GPU 830, a TOGPU REPLACE( ) interface 827 for insertion or replacement of rules of rule set 831 using REPLACE kernel 837 of GPU 830, and a TOGPU LOOKUP( ) interface 828 for performing lookups for tuples in rule set 831 using LOOKUP kernel 838 of GPU 830. The userspace daemon 820 also includes a GPU2CPU MAP 829, which is a data structure that includes mappings between indexes of rules in rule set 831 of GPU 830 and the memory location of the corresponding packet classification rule in the memory of the userspace daemon 820. Thus, for looking up a set of tuples, the userspace daemon 820 launches TOGPU LOOKUP( ) interface 828 to GPU 830, the GPU 830 returns the indexes of packet classification rules of rule set 831 matching the tuples, and the userspace daemon 820 uses the GPU2CPU MAP 829 to identify the action of the highest priority rule(s) matching the tuples. It is noted that, if no wildcard matching rule is found by userspace daemon 820 in conjunction with GPU 830, the userspace daemon 820 uses the ofconn module 821 to send a request to the OpenFlow controller 801 for further resolution of the packet.

It will be appreciated that, although primarily depicted and described herein with respect to embodiments in which respective portions of the set of packet classification information are assigned to processing blocks and a set of tuples is evaluated by each of the processing blocks based on respective portions of the set of packet classification information assigned to those processing blocks (e.g., the respective portions of the set of packet classification information are loaded into the shared memories of the processing elements on which the processing blocks are run), in at least some embodiments, respective portions of the set of tuples to be classified are assigned to processing blocks and the processing blocks evaluate the respective portions of the set of tuples assigned to the processing blocks based on a set of packet classification information (e.g., a set of packet classification information maintained in the device memory of the second processing unit).

It will be appreciated that, although primarily depicted and described herein with respect to embodiments in which either respective portions of the set of packet classification information are assigned to processing blocks or respective portions of the set of tuples to be classified are assigned to processing blocks, in at least some embodiments a given processing block may be assigned both a respective portion of the set of packet classification information and a respective portion of the set of tuples to be classified such that the processing block is responsible for evaluating each tuple in the respective portion of the set of tuples to be classified based on the respective portion of the set of packet classification information assigned to the processing block. The assignment of respective portions of the set of packet classification information and respective portions of the set of tuples to be classified to processing blocks in this manner enables the full set of processing blocks being used to perform packet classification for the full set of tuples based on the full set of packet classification information in a distributed manner.

Various embodiments of the packet classification capability enable exploitation of the inherent parallel programming model used by GPU devices (or GPU-like devices) in order to support faster packet classification. Various embodiments of the packet classification capability use the high parallelism and latency-hiding capabilities of GPUs devices (or GPU-like devices) in order to support faster packet classification. Various embodiments of the packet classification capability support modification of existing packet classification processes (e.g., linear search, tuple search, Bloom search or the like) in a manner for exploiting the inherent parallel programming model used by GPU devices (or GPU-like devices) in order to support faster packet classification. Various embodiments of the packet classification capability overcome various challenges related to the inherent parallel programming model used by GPU devices (or GPU-like devices), thereby supporting improved exploitation of the inherent parallel programming model used by GPU devices (or GPU-like devices) for speeding up packet classification.

It will be appreciated that, although primarily depicted and described within the context of supporting packet classification within a specific type of APU (namely, an APU in which the primary processing unit is a CPU and the secondary processing unit is a GPU), various embodiments of the packet classification capability may be supported using other types of APUs (e.g., an APU in which the primary processing unit is a CPU and the secondary processing unit is a Field Programmable Gate Array (FPGA), or the like).

Various embodiments of the packet classification capability enable throughput of packet processing to be maintained at a relatively high level even as the number of packet classification rules and the number of header fields grows, e.g., in applications such as software-defined networks (SDN) and other types of environments in which relatively large numbers or rules or fields may be present.

Various embodiments of the packet classification capability provide significant improvements over existing software-based packet classifiers. For example, at least some embodiments of the linear search process 200 may be able to achieve throughput of approximately 20 Gbps for 1024 wildcard rules, which has been determined to be approximately 5.7 times faster than at least some existing software-based packet classifiers that use linear search for packet classification. For example, at least some embodiments of the Bloom search process may be able to achieve throughput of approximately 10 Gbps with minimum-sized 64-byte packets for a relatively large table including 131,072 (128K) rules and 512 wildcard patterns. For example, at least some embodiments in which the packet classification capability is used to provide an accelerated version of Open vSwitch may be able to achieve throughput of approximately 40 Gbps or more.

It will be appreciated that, although primarily depicted and described within the context of supporting packet classification, various embodiments depicted and described herein may be adapted to use an APU for any other suitable type of data processing, such as data matching, data lookups, or the like. For example, various embodiments depicted and described herein may be adapted for use in data matching or other types of data processing which may be performed in applied statistics, data management, data mining, machine learning, artificial intelligence, database management, healthcare applications, or the like, as well as various combinations thereof. Thus, it will be appreciated that use herein of terms specific to packet classification may be read more generally (e.g., the term "packet classification information" may be read more generally as being data matching information, the term "packet classification rule" may be read more generally as data matching rule or data matching information, the term "tuple" may be read more generally as being a data set or a set of data fields, and so forth) so as to apply to various other types of data processing in which the various embodiments may be used, as well as to various other environments and contexts in which the various embodiments may be employed.

Figure 9:
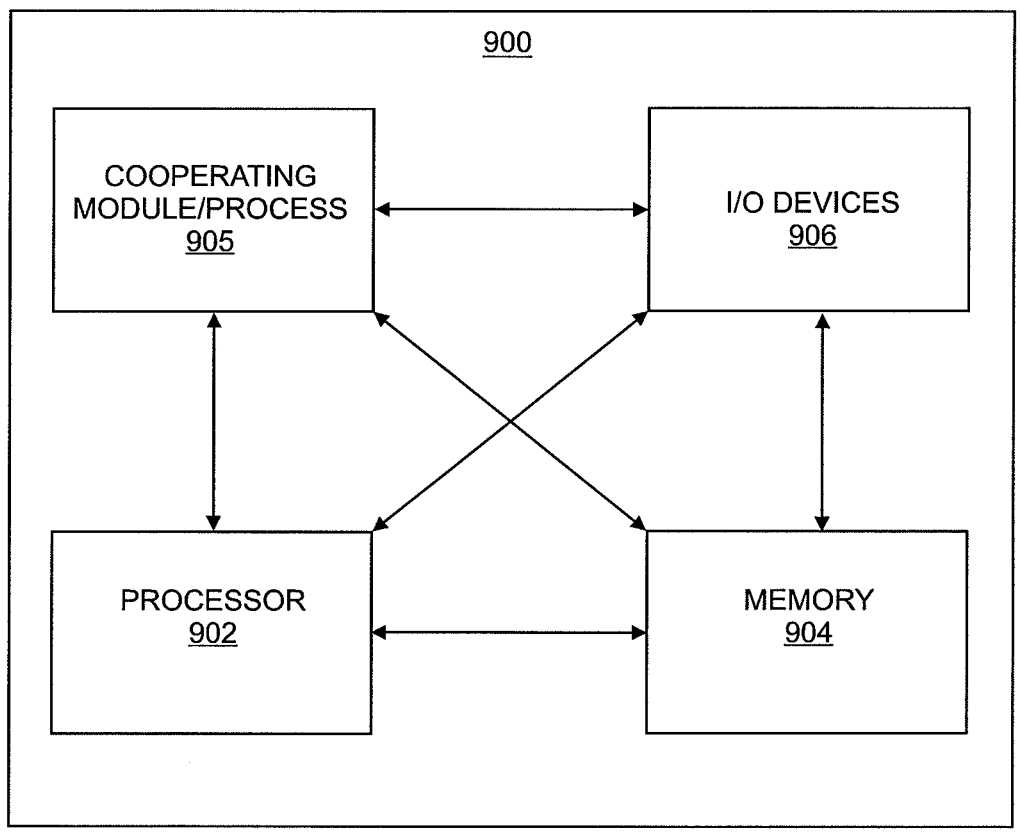
FIG. 9 depicts a high-level block diagram of a computer suitable for use in performing functions presented herein.

FIG. 9 depicts a high-level block diagram of a computer suitable for use in performing functions described herein.

The computer 900 includes a processor 902 (e.g., a central processing unit (CPU) and/or other suitable processor(s)) and a memory 904 (e.g., random access memory (RAM), read only memory (ROM), and the like).

The computer 900 also may include a cooperating module/process 905. The cooperating process 905 can be loaded into memory 904 and executed by the processor 902 to implement functions as discussed herein and, thus, cooperating process 905 (including associated data structures) can be stored on a computer readable storage medium, e.g., RAM memory, magnetic or optical drive or diskette, and the like.

The computer 900 also may include one or more input/output devices 906 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 900 depicted in FIG. 9 provides a general architecture and functionality suitable for implementing functional elements described herein and/or portions of functional elements described herein. For example, computer 900 provides a general architecture and functionality suitable for implementing one or more of primary processing unit 130, secondary processing unit 140, a processing element 144 of secondary processing unit 140, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a processing unit comprising a device memory and a set of processing elements, the device memory configured to store a set of packet classification information for a set of packet classification rules configured for use in classifying packets, the set of processing elements configured to support a set of processing blocks, the processing blocks having respective portions of the set of packet classification information assigned thereto, the processing unit configured to:
receive a set of tuples of a set of packets to be classified; and
determine, based on evaluation of the set of tuples by each of the processing blocks using the respective portions of the packet classification information assigned to the processing blocks, a set of matched packet classification rules matching the set of tuples of the packets to be classified.

2. The apparatus of claim 1, wherein one of the processing blocks is configured to run on one of the processing elements, wherein the one of the processing elements comprises a shared memory, wherein the one of the processing blocks is configured to:
load, from the device memory into the shared memory of the one of the processing elements, at least a part of the respective portion of the set of packet classification information assigned to the one of the processing blocks.

3. The apparatus of claim 1, wherein one of the processing blocks is configured to run on one of the processing elements, wherein the one of the processing elements comprises a shared memory, wherein the one of the processing blocks is configured to:
load, from the device memory into the shared memory of the one of the processing elements, a first part of the respective portion of the set of packet classification information assigned to the one of the processing blocks;
evaluate each of the tuples in the set of tuples based on the first part of the respective portion of the set of packet classification information;
load, from the device memory into the shared memory of the one of the processing elements, a second part of the respective portion of the set of packet classification information assigned to the one of the processing blocks; and
evaluate each of the tuples in the set of tuples based on the second part of the respective portion of the set of packet classification information.

4. The apparatus of claim 1, wherein one of the processing blocks is configured to run on one of the processing elements, wherein the one of the processing elements comprises a shared memory, wherein the one of the processing blocks is configured to:
load, from the device memory into the shared memory of the one of the processing elements, a first subset of tuples from the set of tuples of the packets;
evaluate each of the tuples in the first subset of tuples based on the respective portion of the set of packet classification information assigned to the one of the processing blocks;
load, from the device memory into the shared memory of the one of the processing elements, a second subset of tuples from the set of tuples of the packets;
evaluate each of the tuples in the second subset of tuples based on the respective portion of the set of packet classification information assigned to the one of the processing blocks.

5. The apparatus of claim 1, wherein one of the processing blocks is configured to run on one of the processing elements, wherein the one of the processing elements comprises a shared memory, wherein the one of the processing blocks comprises a processing thread configured to:
read one of the tuples of the set of tuples from the device memory of the processing element; and
evaluate the one of the tuples based on the respective portion of the set of packet classification information assigned to the one of the processing blocks.

6. The apparatus of claim 5, wherein the one of the processing blocks is configured to:
based on a determination that the one of the tuples matches a packet classification rule in the respective portion of the set of packet classification information assigned to the one of the processing blocks, write an indication of the matched packet classification rule for the one of the tuples to the device memory for inclusion in the set of matched packet classification rules.

7. The apparatus of claim 5, wherein the one of the processing elements is configured to:
based on a determination that the one of the tuples matches multiple packet classification rules in the respective portion of the set of packet classification information assigned to the one of the processing blocks:
identify a highest priority packet classification rule of the multiple packet classification rules; and
write an indication of the highest priority packet classification rule to the device memory for inclusion in the set of matched packet classification rules.

8. The apparatus of claim 5, wherein the set of packet classification information comprises the set of packet classification rules, wherein the respective portion of the set of packet classification information assigned to the one of the processing blocks comprises a subset of packet classification rules from the set of packet classification rules.

9. The apparatus of claim 8, wherein, to evaluate the one of the tuples, the processing thread is configured to:
determine, for each packet classification rule in the subset of packet classification rules, whether the one of the tuples matches the packet classification rule.

10. The apparatus of claim 5, wherein the set of packet classification information comprises:
a class table from a set of class tables maintaining respective subsets of packet classification rules from the set of packet classification rules; and
a class mask, from a set of class masks associated with the set of class tables, that is configured for use with the class table.

11. The apparatus of claim 10, wherein, to evaluate the one of the tuples, the processing thread is configured to:
determine a masked tuple for the one of the tuples based on the one of the tuples and the class mask; and
determine, based on the masked tuple, whether the one of the tuples matches one of the packet classification rules of the subset of packet classification rules in the class table.

12. The apparatus of claim 10, wherein the class table is composed of a set of sub-tables based on hashing, wherein each of the sub-tables comprises a respective set of slots, wherein, to evaluate the one of the tuples, the processing thread is configured to:
perform a logical AND operation on the one of the tuples and the class mask to derive thereby a masked tuple;
for each sub-table in the set of sub-tables, compute a candidate slot for the masked tuple based on a hash function of the sub-table; and
compare a packet classification rule of the candidate slot with the masked tuple.

13. The apparatus of claim 12, wherein the one of the processing blocks is configured to:
based on a determination that the packet classification rule of the candidate slot matches the masked tuple, identify the packet classification rule as a matching packet classification rule for the one of the tuples.

14. The apparatus of claim 5, wherein the set of packet classification information comprises:
a class table from a set of class tables maintaining respective subsets of packet classification rules from the set of packet classification rules;

a class mask, from a set of class masks associated with the set of class tables, that is configured for use with the class table; and a class table representation configured to represent the subset of packet classification rules of the class table.

15. The apparatus of claim 14, wherein, to evaluate the one of the tuples, the processing thread is configured to:

determine a masked tuple for the one of the tuples based on the one of the tuples and the class mask;

determine, based on the masked tuple, whether the class table representation is indicative that the class table is potentially storing a matching packet classification rule for the one of the tuples; and searching the class table for a matching packet classification rule for the one of the tuples based on a determination that the class table representation is indicative that the class table is potentially storing a matching packet classification rule for the one of the tuples.

16. The apparatus of claim 1, wherein one of the processing blocks comprises a set of processing threads configured to:

read respective ones of the tuples of the set of tuples from the device memory; and evaluate the respective ones of the tuples based on the respective portion of the set of packet classification information assigned to the one of the processing blocks.

17. The apparatus of claim 1, wherein the processing unit is configured to represent each packet classification rule in the set of matched packet classification rules using a respective identifier of the packet classification rule.

18. The apparatus of claim 1, wherein the processing unit is configured to distribute the set of processing blocks across the set of processing elements.

19. The apparatus of claim 1, wherein the processing unit is configured to:

receive the set of tuples associated with the packet from a second processing unit; and propagate indications of the set of matched packet classification rules toward the second processing unit.

20. The apparatus of claim 16, wherein the processing unit is a Graphics Processing Unit (GPU) and the second processing unit is a Central Processing Unit (CPU).

21. The apparatus of claim 1, further comprising:

a second processing unit configured to:

propagate, toward the processing unit, the set of packet classification information and the set of tuples associated with the packet;

receive, from the processing unit, the set of matched packet classification rules for the set of tuples of the packet to be classified; and select a matched packet classification rule for the packet from the set of matched packet classification rules; and perform an action on the packet based on the matched packet classification rule selected for the packet.

22. A method, comprising:

receiving, at a processing unit, a set of tuples of a set of packets to be classified, the processing unit comprising a device memory and a set of processing elements, the device memory configured to store a set of packet classification information for a set of packet classification rules configured for use in classifying packets, the set of processing elements configured to support a set of processing blocks, the processing blocks having respective portions of the set of packet classification information assigned thereto; and determining, by the processing unit based on evaluation of the set of tuples by each of the processing blocks using the respective portions of the packet classification information assigned to the processing blocks, a set of matched packet classification rules matching the set of tuples of the packets to be classified.

23. A non-transitory computer-readable storage medium storing instructions which, when executed by a computer, cause the computer to perform a method, the method comprising:

receiving, at a processing unit, a set of tuples of a set of packets to be classified, the processing unit comprising a device memory and a set of processing elements, the device memory configured to store a set of packet classification information for a set of packet classification rules configured for use in classifying packets, the set of processing elements configured to support a set of processing blocks, the processing blocks having respective portions of the set of packet classification information assigned thereto; and determining, by the processing unit based on evaluation of the set of tuples by each of the processing blocks using the respective portions of the packet classification information assigned to the processing blocks, a set of matched packet classification rules matching the set of tuples of the packets to be classified.

* * * * *